July 17, 1934.    H. JACOB    1,966,981
METER
Filed July 27, 1932
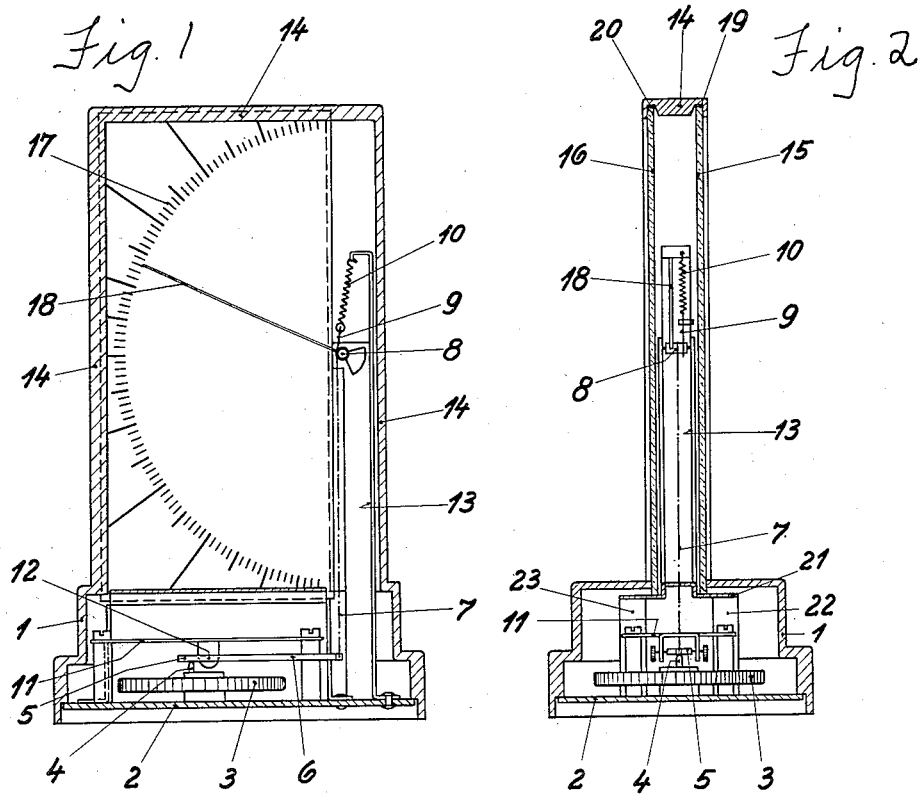
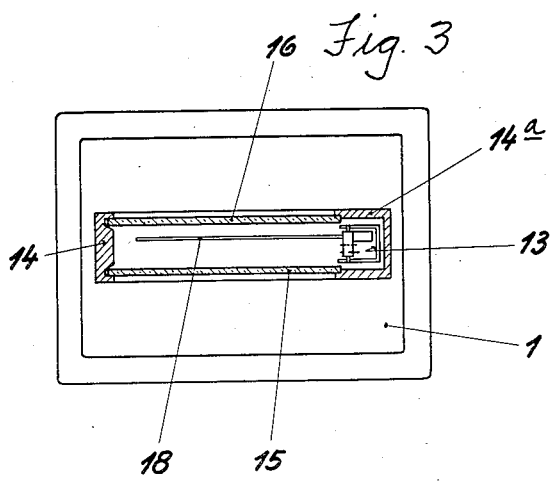
Inventor:
Heinrich Jacob
By B. Singer, Atty.

Patented July 17, 1934

1,966,981

UNITED STATES PATENT OFFICE 1,966,981

METER

Heinrich Jacob, Berlin-Friedenau, Germany, assignor to the firm Zeiss Ikon Aktiengesellschaft Goerz-Werk, Zehlendorf, near Berlin, Germany Application July 27, 1932, Serial No. 625,159
In Germany May 14, 1932

5 Claims. (Cl. 116—129)

This invention relates to improvements in barometers and similar meteorological instruments for general use, of the kind in which an indicating device is arranged upon a hollow base containing the measuring device, and in which the indicating device consists of a pointer, a scale and two enclosing glass plates which are separated by a frame, and in which the scale is arranged on one of the glass plates. The glass scale, the glass covering plates and the frame have heretofore been made circular and the pointer has been carried by an axis journalled in the center of the scale plate in a sleeve. Heretofore a thin wire has served as transmission member from the measuring device to the indicating device, which wire entered the scale casing from the hollow base and was provided at its end with a chain laid around the axis of the pointer.

Such prior construction has the disadvantage that the instrument must be assembled and adjusted as a whole by the mechanic. If instruments with differently divided and numbered scales and with legends in different languages were to be produced, it was necessary to determine beforehand how many instruments with scales of different form should be mounted and kept in stock by the manufacturer or dealer. It was also necessary to stock instruments with different scales in places with international buyers.

It is the object of the present invention to provide an instrument with a detachable glass covering plate, on which the scale is arranged, and which plate may be exchanged at any time for another. For this purpose the pointer axis is journalled independently of the glass plates enclosing the indicating device and especially independently of the scale plate, and the glass plates are inserted into the enclosing frame so that they can be readily taken out and replaced by others. An especially advantageous arrangement is obtained when the glass plates and the frame constitute a cross-sectionally angular casing and the frame is widened on one side and hollow, so that it has room for the reception of the standard which is an element of the instrument assembly and which extends from the scale casing into the base and is fastened there to the base plate or carrier of the measuring device assembly. The whole scale remains free in this case from any matter obstructing the view. Only the scale and the pointer can be seen through the glass plates while the bearing of the axis is concealed in the cavity of the frame. If the axis is arranged in half the height of the quadrangular scale, a scale of approximately half circular form is obtained. If the scale point corresponding to the average air pressure in the barometer is positioned in the center of the half circle, a rising of the pointer indicates a rising air pressure and a lowering of the pointer indicates decreasing air pressure. The appearance of the scale and the movement of the pointer are especially evident. The appearance is similar to a quicksilver barometer, while this is not the case in an aneroid barometer with circular scale.

With the above and other objects in view, the invention consists in the construction, combination and arrangement of devices hereinafter described and claimed.

In the accompanying drawing

Figure 1 is a vertical sectional view of an instrument such as an aneroid barometer constructed and arranged in accordance with my invention.

Figure 2 is a similar view of the same on a plane at right angles to that of Figure 1.

Figure 3 is a horizontal sectional view of the same.

An embodiment of the subject matter of the application in the form of a table barometer is represented in the attached drawing. The hollow base is designated with 1; a base plate 2 is situated therein and serves as a carrier for the measuring device; the aneroid capsule 3 is fastened thereto and it lies with a pin 4 against a short arm of the lever 5. The long arm 6 of the lever is fastened to a chain 7, which is wound with its upper end around the pointer axis 8. A second short chain 9 is wound around the pointer axis and held under tension by a spring 10 against the action of the pressure of the capsule. Thereby lost motion is prevented in the transmission and the axis 8 does not receive a one-sided bearing pressure. This arrangement has the further advantage that only a single transmission lever is used.

A bridge 11 is arranged on the base plate 2, which bridge receives the axle pin 12 of the lever 5. The bearing of the pointer axis 8 is supported by the standard 13, which is rigidly connected with the base plate 2. The base plate 2 can be secured to the hollow base 1 from below by means of screws or the like. The frame 14 may be fastened to the base 1 or formed integrally therewith. The frame encloses the glass plates 15, 16. The scale 17 is arranged directly on one of these glass plates, and behind which the pointer 18 moves. The standard 13 of the axis 8 has a U-shaped cross-section, as well as the part 14a of the frame 14 enclosing the standard. The frame is furthermore provided with grooves 19, 20, into which the glass plates may be inserted. The grooves are open at their lower ends into the interior of the hollow base so that the glass plates may be drawn downwardly and removed from the frame, when the whole measuring device with the standard 13 and the pointer is taken out. This enables fillets, screws, and the like fastening means which would be visible from the outside for fastening the glass plates to be dispensed with. In the embodiment shown in the drawing the glass plates are supported from below by the top 21 of a supporting member, the arms 22, 23 of which are fastened to the base plate 2 of the measuring device. The part of the top 21 projecting into the space between the glass plates closes the cavities of the base and the scale casing in the plane of the upper surface of the base.

The adjustment of the measuring device consisting of the base plate 2, box 3 and lever 5, can be accomplished by means of an auxiliary scale with the pointer 18 journalled on the post 13 without the parts of the instrument casing. Such construction enables a number of completely adjusted measuring devices to be kept in stock independently of the casing and the scale, and when assembling the devices scales of the required kind may be inserted immediately before the shipping, according to the kind of instruments to be supplied. Scales of different kinds may be kept in stock at the place of sale and inserted according to the desire of the buyer.

In order to produce thermometers a bimetallic strip sensitive to differences in temperature can be inserted instead of the aneroid box or capsule 3, or a body sensitive to changes in humidity of the air, if a hygrometer is to be constructed. In the latter case the walls of the hollow base are provided with openings so that the air may easily enter.

While I have herein shown and described a preferred form of the invention, I would have it understood that changes may be made in the form, proportion and construction of the several parts without departing from the spirit of the invention and within the scope of the appended claims.

What I claim is:

1. The combination of a casing and a complete meteorological instrument having an element responsive to changes in atmospheric conditions and provided with a pointer, the said casing having a transparent covering plate forming one side thereof and removable therefrom, said covering plate having a scale with which the pointer cooperates, the pointer being journalled independently of the scale and the covering plate.

2. The combination of a casing and a complete meterological instrument detachably secured therein and having an element responsive to changes in atmospheric conditions and also having a pointer, said casing having a detachable member provided with a scale for cooperation with the pointer, said member being entirely disconnected from and independent of the axis of the pointer.

3. An instrument of the class described, comprising a complete assembly including a base, a standard and a pointer having a bearing mounted in the standard and carried thereby; a casing in which said assembly is detachably arranged, said casing having a member detachable therefrom and provided with a scale to cooperate with the pointer.

4. An instrument as claimed in claim 3, in which the casing is open at the lower end, in which the detachable scale bearing member of the casing is removable therefrom through the open lower end thereof and in which the supporting base of the instrument assembly is arranged in and detachably secured to the lower portion of the casing so that the standard extends upwardly in the casing at one side thereof.

5. A measuring instrument comprising a hollow base having an opening in its upper side, a base plate detachably secured to the base and removable therefrom through the lower side thereof, a frame rising from the base, a movable member mounted on the base plate and having a pin, a bridge member on the base plate, a lever having a supporting pivot carried by the bridge member, said lever being arranged to be moved by said pin, a standard rising from the base plate, a pointer pivotally mounted on said standard and having an axle, a cord connecting the axle to the lever, a countervailing spring carried by the standard and also connected to the cord, and a plate detachably fitted in the frame extending through the opening in the base and movable downwardly from said frame through said opening, and means on the base plate bearing against the under edge of said plate and supporting the same when the parts of the instrument are assembled.

HEINRICH JACOB.